(12) United States Patent
Czajkowski (10) Patent No.: US 8,886,994 B2
(45) Date of Patent: Nov. 11, 2014

(54) RADIATION HARD AND FAULT TOLERANT MULTICORE PROCESSOR AND METHOD FOR IONIZING RADIATION ENVIRONMENT

(75) Inventor: David R. Czajkowski, Encinitas, CA (US)

(73) Assignee: Space Micro, Inc., San Diego, CA (US)

( * ) Notice: Subject to any disclaimer, the term of this patent is extended or adjusted under 35 U.S.C. 154(b) by 823 days.

(21) Appl. No.: 12/928,084

(22) Filed: Dec. 3, 2010

(65) Prior Publication Data

US 2011/0208997 A1 Aug. 25, 2011

Related U.S. Application Data (60) Provisional application No. 61/283,495, filed on Dec. 7, 2009.

(51) Int. Cl.
*G06F 11/00* (2006.01)
*G06F 11/16* (2006.01)
*G06F 11/14* (2006.01)
*G06F 11/18* (2006.01)

(52) U.S. Cl.
CPC .......... *G06F 11/1641* (2013.01); *G06F 11/165* (2013.01); *G06F 11/1497* (2013.01); *G06F 2201/805* (2013.01); *G06F 2201/815* (2013.01); *G06F 11/182* (2013.01)
USPC .......................................................... 714/11

(58) Field of Classification Search
USPC .......................................................... 714/11
See application file for complete search history.

(56) References Cited

U.S. PATENT DOCUMENTS

| | | | |
|---|---|---|---|
| 7,734,970 B2 | 6/2010 | Drake et al. | |
| 2003/0188222 A1* | 10/2003 | Abbondanzio et al. | 714/12 |
| 2008/0082893 A1 | 4/2008 | Wang | |
| 2008/0091996 A1* | 4/2008 | Chung | 714/727 |
| 2008/0189538 A1* | 8/2008 | King et al. | 713/1 |
| 2008/0216074 A1* | 9/2008 | Hass et al. | 718/100 |
| 2009/0031317 A1 | 1/2009 | Goplan et al. | |
| 2009/0044044 A1* | 2/2009 | Harter et al. | 714/6 |
| 2010/0037038 A1* | 2/2010 | Bieswanger et al. | 712/220 |
| 2010/0318774 A1* | 12/2010 | Abts et al. | 712/234 |

* cited by examiner

*Primary Examiner* — Scott Baderman
*Assistant Examiner* — Jigar Patel
(74) *Attorney, Agent, or Firm* — Continuum Law; Robert P. Cogan (57) ABSTRACT

A redundancy system in a fault tolerant computer comprises a multiple core processor which may support a real time operating system. The multiple core machine may be actual or virtual. Multiple identical instructions, e.g., three instructions, are executed redundantly so that the redundancy system can detect and recover from a single event upset (SEU). The instructions are also displaced in time. In one form, two non-consecutive instructions are run on one core which is virtualized into two cores. Alternatively, a second actual core may provide symmetric processing. The system prevents single event functional interrupts (SEFIs) from hanging up the processor. Each core may run a separate operating system. When a first core hangs up a first operating system, the second operating system takes over operation and the processor recovers. Embedded routines may store selected data variables in memory for later recovery and perform an SEFI "self-test" routine.

16 Claims, 11 Drawing Sheets

| H-Core3 Signal | Description | MPC8640D Signal | Core | Function |
|---|---|---|---|---|
| Cycle_IN_Chip | Resets Chip (IC) | HRESET\ | Both Cores – Chip | System Reset |
| Cycle_IN_Core_0 | Resets Core 0 | SRESET0\ | Core 0 | Core 0 Reset |
| Cycle_IN_Core_1 | Resets Core 1 | SRESET1\ | Core 1 | Core 1 Reset |
| Interupt_Out_1 | Interupts MCP_0 | MCP_0 | Core 0 | Interupt |
| Interupt_Out_2 | Interupts SMI_0 | SMI_0 | Core 0 | Interupt |
| Interupt_Out_3 | Interupts IRQ_0 | IRQ_0 | Core 0 | Interupt |
| Interupt_Out_4 | Interupts MCP_1 | MCP_1 | Core 1 | Interupt |
| Interupt_Out_5 | Interupts SMI_1 | SMI_1 | Core 1 | Interupt |
| Interupt_Out_6 | Interupts IRQ_1 | IRQ_1 | Core 1 | Interupt |
| Core_0 | Flag for Core 0 | NA | Core 0 | Flag |
| Core_1 | Flag for Core 1 | NA | Core 1 | Flag |
| Chip_Flg | Flag for Chip | NA | Both Cores – Chip | Flag |

RADIATION HARD AND FAULT TOLERANT MULTICORE PROCESSOR AND METHOD FOR IONIZING RADIATION ENVIRONMENT

CROSS-REFERENCE TO RELATED APPLICATIONS

This application claims priority from provisional application Ser. No. 61/283,495 entitled "Radiation Hard and Fault Tolerant Multicore Processing and Computing for Space Environments," filed on Dec. 7, 2009. The contents of this provisional application are fully incorporated herein by reference.

BACKGROUND OF THE INVENTION

1. Field of the Invention

The present subject matter relates to an apparatus and a method SEFIs from occurring in an ionizing radiation environment, e.g., outer space, in a processor having a real time operating system.

2. Background

Computers which operate in an ionizing-radiation environment, e.g., outer space, are exposed to ionizing radiation. When gamma rays hit processors, they in effect produce transient signals causing an error in processing behavior. The most significant error events are SEUs (single event upsets) and SEFIs, (single event functional interrupts).

SEUs are defined by NASA as "radiation-induced errors in microelectronic circuits caused when charged particles (usually from the radiation belts or from cosmic rays) lose energy by ionizing the medium through which they pass, leaving behind a pathway of electron-hole pairs. SEUs are "soft errors." In other words, after a processor is reset, normal behavior will follow. However, data may have been corrupted, and the error must be accounted for.

An SEFI is a condition in which a processor's control circuitry causes the processor to cease normal operation. The average number of gamma rays hitting a processor in space has been calculated. The statistical likelihood of causing errors in the process is low. However, such errors must be accounted for and corrected.

U.S. Pat. No. 7,734,970 discloses self-resetting, self-correcting latches in which a value is loaded into at least three latched stages and which senses whether the latched stage outputs are equal. This apparatus may be utilized in a dual core processor or a single core processor. However, this system is not oriented toward responding to SEUs and SEFIs.

United States Patent Publication No. 2008/0082893 discloses error correction in a system for multithreaded computing utilizing dynamic multi-threading redundancy. This system does not provide for time redundant and space redundant error correction.

Prior fault tolerant arrangements do not use multicore processors and have only a single thread of processor operations. United States Patent Publication No. 2009/0031317 discloses an arrangement for scheduling threads in a multi-core system in which threads with fixed affinity for each core are held. This publication does not disclose a fault tolerant system.

Commonly assigned U.S. Pat. No. 7,318,169 discloses a fault tolerant computer including a microprocessor, a fault-tolerant software routine for sending first, second, and third identical instructions to a very long instruction word (VLIW) microprocessor. The instructions are transmitted during first, second, and third clock cycles. If the first and second instructions do not match, a software instruction commands a comparator to compare first, second, and third instructions. Any pair of matching instructions is accepted by the processor as correct.

This construction has been highly successful in solving SEU and SEFI problems. However, this arrangement was provided in the context of a VLIW DSP (very long instruction word digital signal processor). A VLIW DSP utilizes a single instruction stream that issues successive groups of instructions. The VLIW DSP is not suited for running multiple software threads, and the redundancy routine may not be run simultaneously on separate threads.

SUMMARY

Briefly stated in accordance with the present subject matter, a radiation hard and fault tolerant processor for space environments is provided which uses a multicore processor which can run multiple software threads simultaneously and use any of a number of RTOSs (real time operating systems). A redundancy system in a fault tolerant computer comprises a multiple core processor which may support a real time operating system. The multiple core machine may be actual or virtual. A "hypervisor" may virtualize a single core into two virtual circuit boards. Two operating systems are simultaneously run on a dual core processor. One processor is a primary processor, and the second processor provides redundancy for backup. The first and second operating systems operate in a virtualized compatible mode. Multiple identical instructions, e.g., three, are executed redundantly so that the redundancy system can detect and recover from a single event upset (SEU). The instructions are also displaced in time. In one form, two non-consecutive instructions are run on one core which is visualized into two cores. Alternatively, a second actual core may provide symmetric processing.

Additionally, an H-core, i.e., a hardened core, arrangement which uses separate program counters is provided. This permits each core to run a separate operating system. The system prevents single event functional interrupts (SEFIs) from hanging up the processor. When a first core hangs up a first operating system, the second operating system takes over operation and the processor recovers. Embedded routines may store selected data variables in memory for later recovery and perform an SEFI "self-test" routine.

BRIEF DESCRIPTION OF THE DRAWINGS

The invention may be further understood by reference to the following description taken in connection with the following drawings.

DETAILED DESCRIPTION

The following commonly assigned patents are incorporated herein by reference: U.S. Pat. No. 7,237,148 to David Czajkowski and Darrell Sellers, U.S. Pat. No. 7,260,742 to David Czajkowski and U.S. Pat. No. 7,318,169 to David Czajkowski.

Time and Space Modular Redundancy

Figure 1:
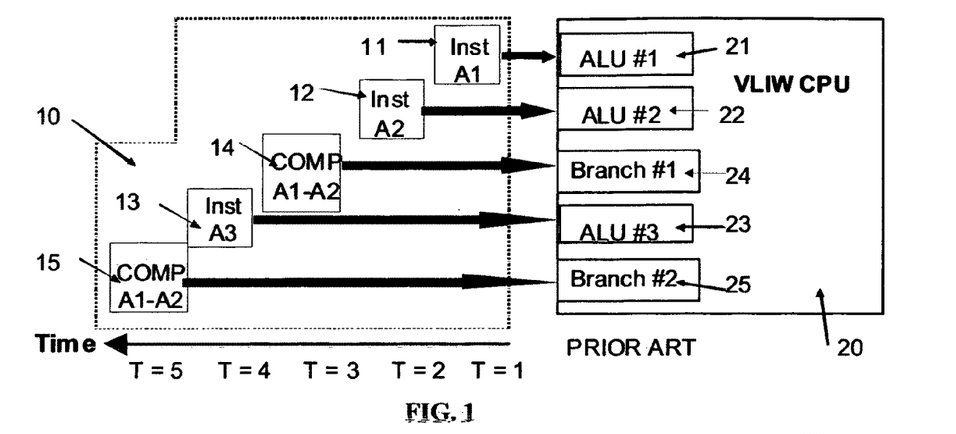
FIG. 1 is a functional block diagram of a prior art Triple-Time Modular Redundancy architecture.

FIG. 1 is a functional block diagram of a prior art Triple-Time Modular Redundancy architecture. This diagram is useful in understanding the concept of combining triple modular redundancy and time redundancy. A software controller unit 10 provides instructions to a CPU 20. The software controller 10 produces first and second instructions 11 and 12, and may produce a third instruction 13. The first, second, and third instructions 11, 12, and 13 are identical. Comparison command 14 is produced during each operating cycle, and comparison command 15 may also be produced. For purposes of the present description, times T1-T5, further described below with respect to FIG. 4, comprise an operating cycle. The first, second, and third instructions 11, 12, and 13 are respectively delivered to first, second, and third ALUs 21, 22, and 23 in the CPU 20. The compare command 14 is provided to a comparator and branch circuit 24 within the CPU 20. The compare command 15 may be provided to a comparator and branch circuit 25 within the CPU 20.

The times T1 through T5, may occur over a succession of clock cycles of the software controller 10. However, this is not essential. At time T1, instruction 11 is provided to the ALU 21. At time T2, the instruction 12 is sent to the ALU 22. At time T3, the comparison command 14 is sent to the branch circuit 24. The branch circuit 24 compares the values of instructions 11 and 12. If the difference is zero, the CPU 20 accepts the value of the instruction 11 and 12 as correct.

If the branch circuit 24 indicates that the values of instructions 11 and 12 are not equal, then a mismatch is indicated. In response to a mismatch, at time T4, the instruction 13 is issued. The instruction 15 commands a compare operation at the branch circuit 25. The instruction 15 is compared to instructions 11 and 12. A vote is taken to determine the correct construction value. It is expected that instructions 11 and 12 will agree approximately 99% of the time. In these cases, instruction 13 and command 15 are not issued.

Triple redundancy is provided in the instructions 11, 12, and 13. Instructions 11, 12, and 13 are issued during successive clock cycles. Therefore, an ionizing particle will affect only the clock cycle in which the instruction 11, 12 or 13 is produced.

Exemplary Embodiments

In the following description, the statements of timing of instructions and operations at particular times, e.g., times T1-T5, are representative of the effect of operations. Billions of operations per second may be executed in a processor. The exact time of execution of an instruction is determined by an instruction scheduler within the processer. The scheduler calls for operations in accordance with a known, selected instruction execution regime. Scheduler operation and processor bandwidth limitations affect actual timing. The descriptions of the embodiments of FIGS. 2 through 5 is generally at a lower level, i.e., closer to instruction level, than that for the description of subsequent embodiments. Generally, higher level instructions require less coding of specific operations. In some applications, a user may prefer to use higher level coding.

Figure 2:
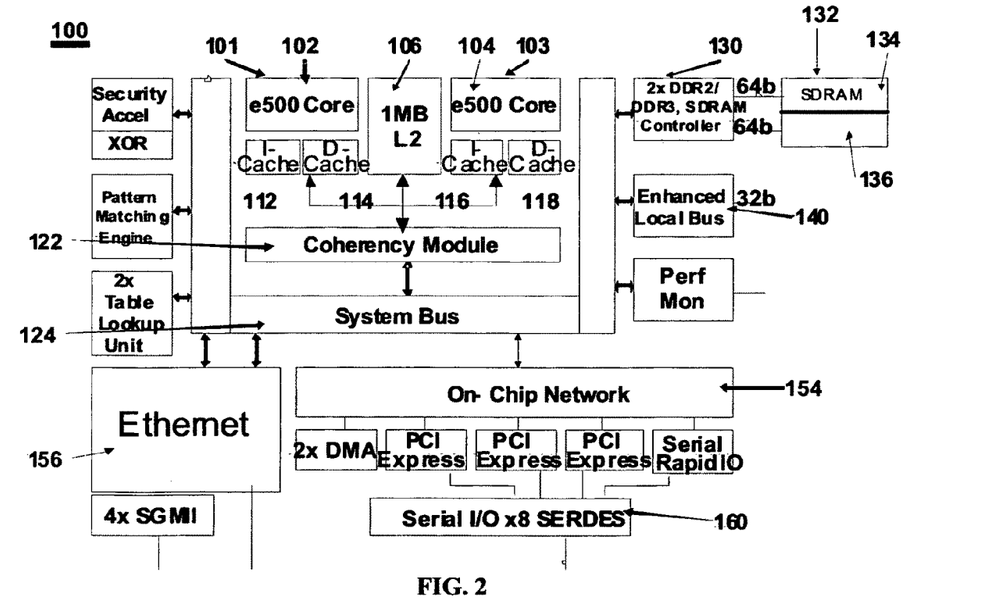
FIG. 2 is a block diagram of a processor which may be used in the current embodiments.

FIG. 2 is a block diagram of a processor 100 which may be used in the current embodiments. In this particular illustration, the processor 100 comprises a P2020 dual core architecture processor made by Freescale Semiconductor, Inc. of Austin, Tex. The processor 100 has a first processor section 101 comprising a first core 102. The processor 100 also includes a second processor section 103 comprising a second core 104. The cores 102 and 104 share an L2 cache 106. The L2 cache 106 may nominally have a size of 1 Mb. The cores 102 and 104 may alternatively have separate L2 caches.

Each core 102 and 104 includes L1 cache. The first core 102 may comprise an L1 D-cache 112 and in L1 I-cache 114. The second core 104 may comprise an L1 D-cache 116 and in L1 I-cache 118. "I" indicates instructions and "D" indicates data. The L2 caches 112-118 may be 32 Kb. The quoted cache sizes are nominal. Other sizes may be used in other embodiments. The cores 102 and 104 each provide an output to a coherency module 122 which communicates with a system bus 124.

The system bus 124 also communicate with an SDRAM controller 130. The SDRAM controller 130 interfaces with an SDRAM device 132. In one preferred embodiment, the SDRAM device 132 may be DDR2 SDRAM or SR3 SDRAM. The SDRAM device 132 for purposes of the present description will be viewed as a dual memory SDRAM having first and second memory sections 134 and 136. The SDRAM controller 130 includes memory controllers with error correcting circuits.

The system bus 124 communicates via an enhanced local bus 140. The system bus 124 also communicates with an on-chip network 154. The on-chip network 154 may communicate with devices not on a main processor chip via interfaces such as a PCI express, rapid I/O, and direct memory access channels. Additionally, an Ethernet coupler 156 is provided. The on-chip network 154 and the Ethernet coupler 156 may be connected to a high speed serial I/O, also known as a SerDes 160.

The bus structure of the processor 100 is particularly suited for time and multiple redundancy because parallel buses are able to carry this same data to external output logic. The external output logic can compare instructions to detect SEU errors and then provide correct data on the system bus 124.

Figure 3:
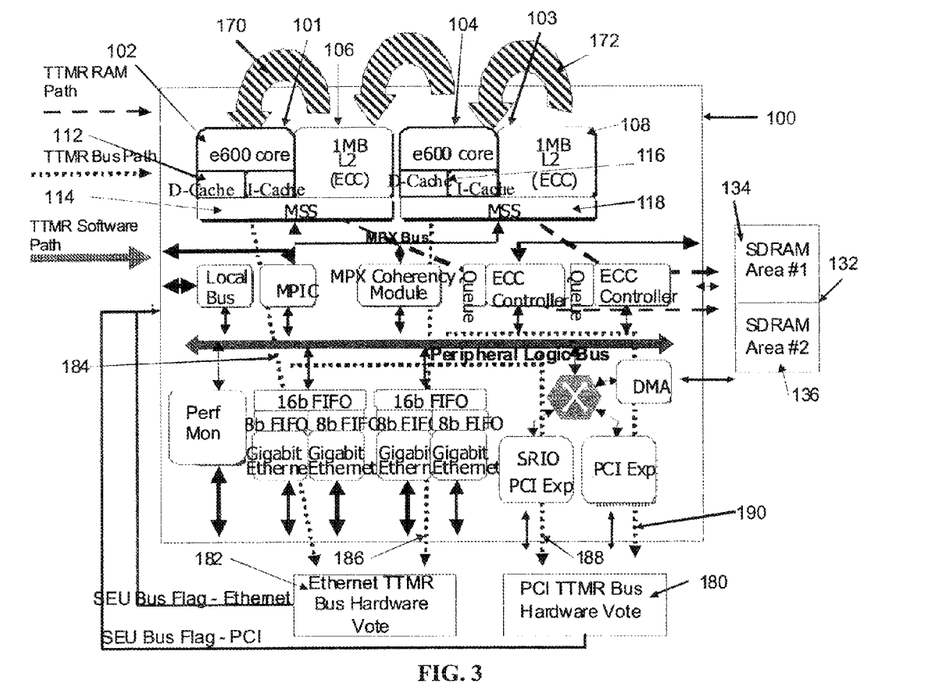
FIG. 3 is a block diagram illustrating functioning of the present subject matter.
Figure 4:
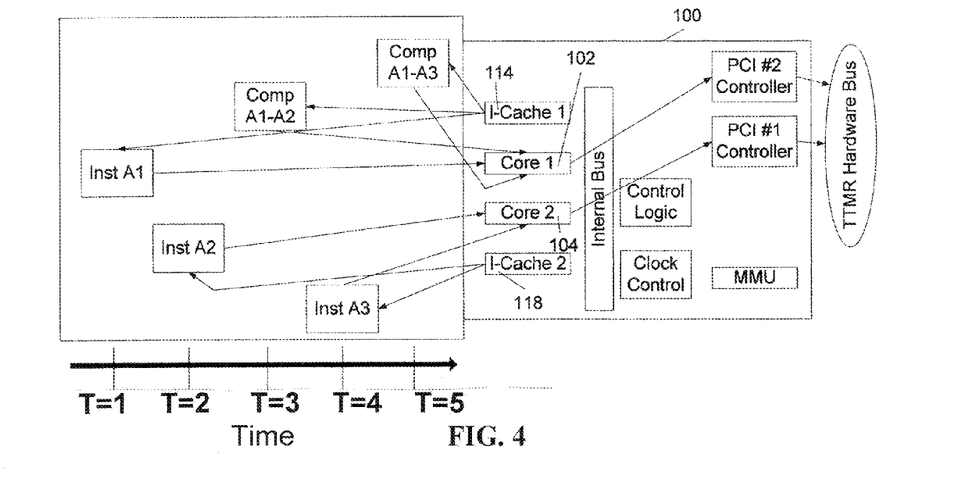
FIG. 4 is a block diagram of a processing circuit constructed in accordance with the present subject matter for providing Triple-Time Modular Redundancy for a dual core or other multicore processor.

FIG. 3 is a functional block diagram illustrating signal flow implementing TTMR operations in the processor 100 of the sort illustrated in FIG. 2. However, the cores 102 and 104 utilize separate L2 caches 106 and 108 respectively. FIG. 4 is functional block diagram illustrating timing of signals discussed with respect to FIG. 3. FIGS. 3 and 4 are discussed together. The same reference numerals are used to denote corresponding elements in FIGS. 2, 3, and 4. The present subject matter takes advantage of the characteristic that dual-core CPUs can operate in different modes and can either run independently or share data. In the present embodiment, the first and second cores 102 and 104 each run software instructions on a separate thread.

As seen in FIG. 4, instructions 170, 172, and 174 may be processed to produce results A1, A2, and A3 respectively. Physically, the following data transfers are performed via internal buses in accordance with specifications for the particular type of processor comprising the processor 100. Operation starts at time T1. An instruction 170 is taken from the L2 cache 106 and run on the core 102. On the next cycle, at time T2, an instruction 172, which is a copy of instruction 170, is accessed from the cache 108 and delivered to the second core 104. Instruction 172 is run on the core 106. At time T3, the results of instructions 170 and 172 are compared on either core 102 or core 104.

Abbondanzio is cited as providing watchdog timers operating in conjunction with service processors in each of a number of management modules.

If the results match, the next instruction 170 is similarly processed at a next time T1. Depending on the timing set up in operation software, a next time T1 could follow T5. Alternatively, timing may be set so that a next T1 follows T2 when the instruction results A1 and A2 agree.

The results A1 and A2 are compared in the SDRAM 132. If the results do not agree, at time T4, a voting instruction 174 is run on the second core 104. The value A1 my be connected to the first area 134 in the SDRAM 132. The value A2 may be connected to the second area 136 in the SDRAM 132. At time T5, a command initiates a comparison of A1 and A3. The comparison is made, for example, by calculating A1-A3. If A1=A3, then the value of A1 is taken as a correct result A. If A1≠A3, then the value of A2 is taken as a correct result A.

A quad core processor 100, i.e., having four cores, could provide triplicate spatial redundancy. A quad core processor has greater power consumption. A designer may make the requisite tradeoffs in order to select a preferred form of the processor 100.

Data is transferred by redundant threads to spatially and time redundant structures from the dual processor core. The signal paths described here are not discrete signal paths. Each signal path is the result of translation of signals thorough a number of stages in accordance with operation of the particular form of processor 100. More specifically, in one form, a signal path 184 and a signal path 186 provide a value from the D-cache 112 and the D-cache 116 respectively to an Ethernet TTMR bus hardware vote circuit 182. In another form, a signal path 188 and a signal path 190 provide a value from the D-cache 112 and the D-cache 116 respectively to a peripheral component interconnect (PCI TTMR) bus hardware vote circuit 180. Either vote circuit 180 or 182 may send the result A to the system bus 124. If desired, both the vote circuits 180 and 182 may be used.

To perform comparison on another software level, an output from the I-cache 114 is provided to the SDRAM section 136, and an output from the I-cache 116 is provided to the SDRAM section 134.

Figure 5:
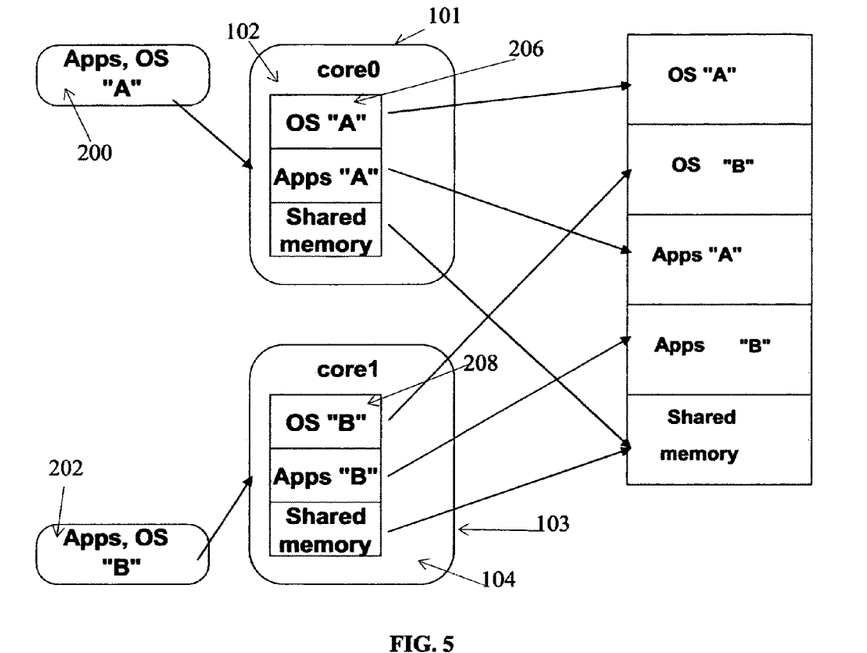
FIG. 5 is a functional block diagram of a dual core processor utilizing a fault tolerant real-time operating system architecture.

FIG. 5 is a functional block diagram of Freescale's MPC 8641D and P2020 operating system asymmetric environment. This circuitry and software may be used in one preferred form of the present subject matter. The dual core architecture supports the use of one type of operating system for the operating systems 206 and 208 for the cores 101 and 103 respectively. An operating system application 200 is provided for the core 102. An operating system 202 is provided for the core 103 respectively. Additionally, shared memory space may be provided. In the asymmetric configuration of FIG. 5, the cores 102 and 104 can share data from both applications that each run on one core. If one of the cores 102 or 104 hangs, both cores can run one operating system.

Triplicate Application Software Embodiment

Briefly, one embodiment may be viewed as three copies of an application software running slightly out of synchronism, each on a different core. Alternatively, two copies of the application may run on one core, each at a different time. Each instance of running the application software is referred to as an application space. In an embodiment comprising a processor 100 with two cores, a third copy of an application would be run on one of the two cores after a first or second copy is complete. The operating system is run as a single copy. As discussed further below, when single event functional interrupts (SEFIs) occur in an operating system, the operating software will "hang." The "hang" will be mitigated by hardened core technology discussed below. Time and spatial redundancy are provided for SEU mitigation.

Figure 6:
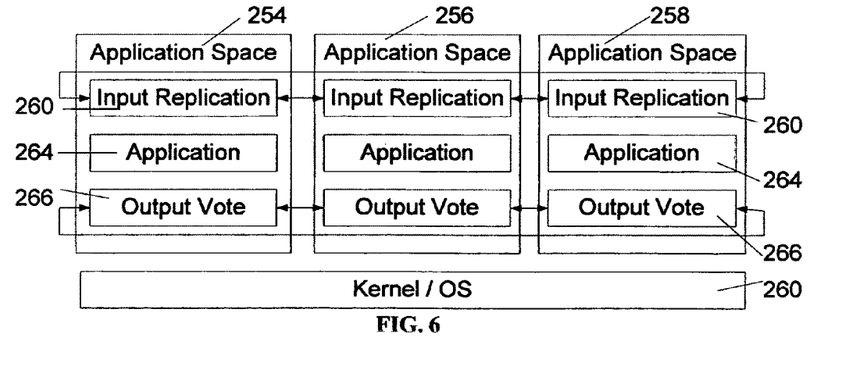
FIG. 6 is a flowchart illustrating architecture of software operating the present system, and also illustrating a software product in accordance with the present subject matter.

FIG. 6 is a functional flowchart illustrating architecture of software operating the present system, and also illustrating a software product in accordance with the present subject matter. As explained above, three copies of an application are run on two cores. Alternatively, with a quad core or other core processor having more than two cores, each copy of an application may be run on a separate core. A kernel/operating system 250 is provided. The operation is illustrated by first, second, and third application spaces 254, 256, and 258. Each application space 254, 256, and 258 includes an input instruction replication 260. Separate input instruction replications 260 are shown in each of the first, second, and third application spaces 254, 256, and 258. The value of input instruction replication 260 in each application space is identical. In preferred embodiments, the application 264 may be run twice followed by a comparison. The application 264 is run a third time if an SEU is detected. Alternatively, the application 264 could run at three different times in each operating cycle. Each replication is operated on by an application 264 to provide an output vote value 266. The output vote values are compared, as, for example, by the means illustrated in FIG. 3 and FIG. 4 above.

The operation described above may be practiced on a system including, for example, a Freescale 8641D processor. The system is configured to perform the redundancy routine on one or more software levels. Redundancy, at a lower level, e.g., the source code statement, may be provided. In some forms, it may preferable to provide redundancy at a higher level, e.g., a subroutine call. Application code may be provided redundancy in an application "loop." Redundancy could alternatively be provided at the instruction level.

Redundant Virtual Machine Embodiment

In this approach, redundant virtual machines (RVMs) are utilized. A redundant virtual machine provides a complete system platform in order to support execution of a complete operating system. One application to which this embodiment is particularly suited is in a server farm. Multiple virtual machines, each operating in its own operating system, are frequently used in server consolidation where different services may run on the same physical machine but still avoid interference.

Virtualization within a processor may be achieved, for example, by utilizing a hypervisor. The hypervisor provides the ability to configure and partition hardware devices, memory, and cores into "virtual boards" that an operating system uses as its execution environment. The hypervisor provides the ability to run multiple different virtual boards on a single processor core (core virtualization) or one virtual board per processor core (supervised AMP). One suitable form of hypervisor is produced by Wind River Systems, Inc. of Alameda, Calif. Virtualization allows multiple virtual machines to run on a host computer concurrently.

Figure 7:
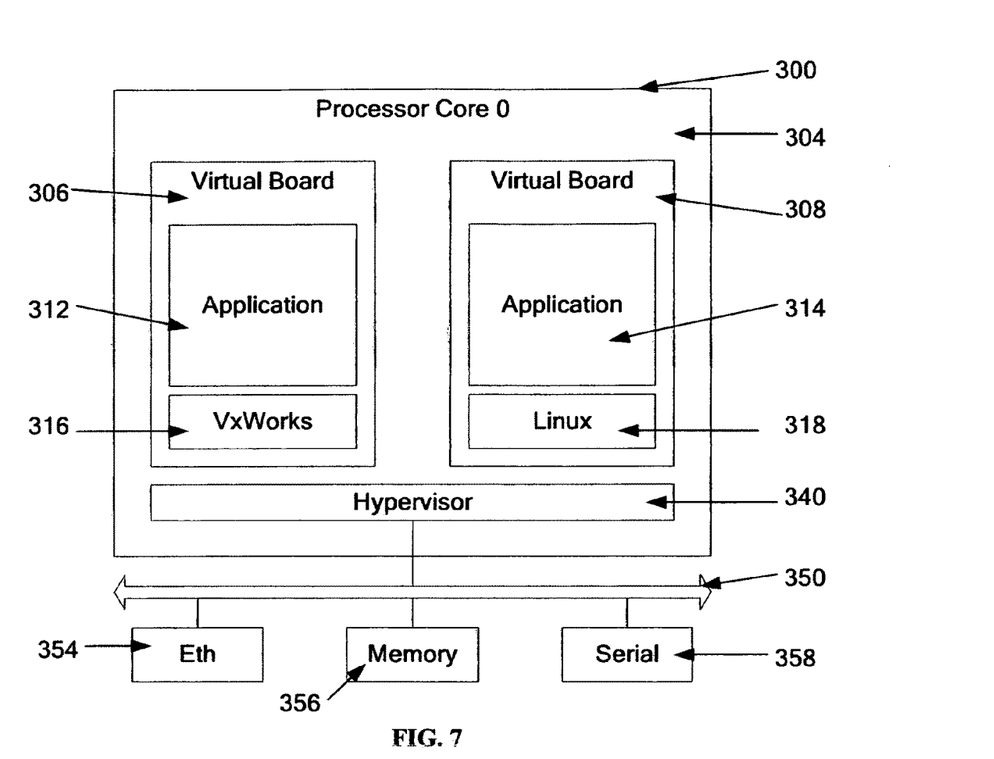
FIG. 7 is a block diagram illustrating a single core virtual machine used in selected embodiments.

FIG. 7 is a block diagram illustrating a single core virtual machine used in selected embodiments. FIG. 7 includes a single core microprocessor 300 having a core 304. The core 304 is arranged into first and second virtual boards 306 and 308. The virtual boards 306 and 308 run applications 312 and 314 respectively. The application at 312 is run, for example, on a Vx Works operating system 316. The application 314 is run on Linux operating system 318. When there is a disagreement in results A1 and A2, an instruction is run to produce a result A3 for comparison in the manner described with respect to FIG. 4.

These operating systems are used for purposes of the present illustration. Other operating systems may be used. The core 304 is coupled by a hypervisor 340 to a data bus 350. In order to exchange data, the data bus 350 may communicate with an Ethernet I/O 354, a memory 356 and a serial I/O 358.

Figure 8:
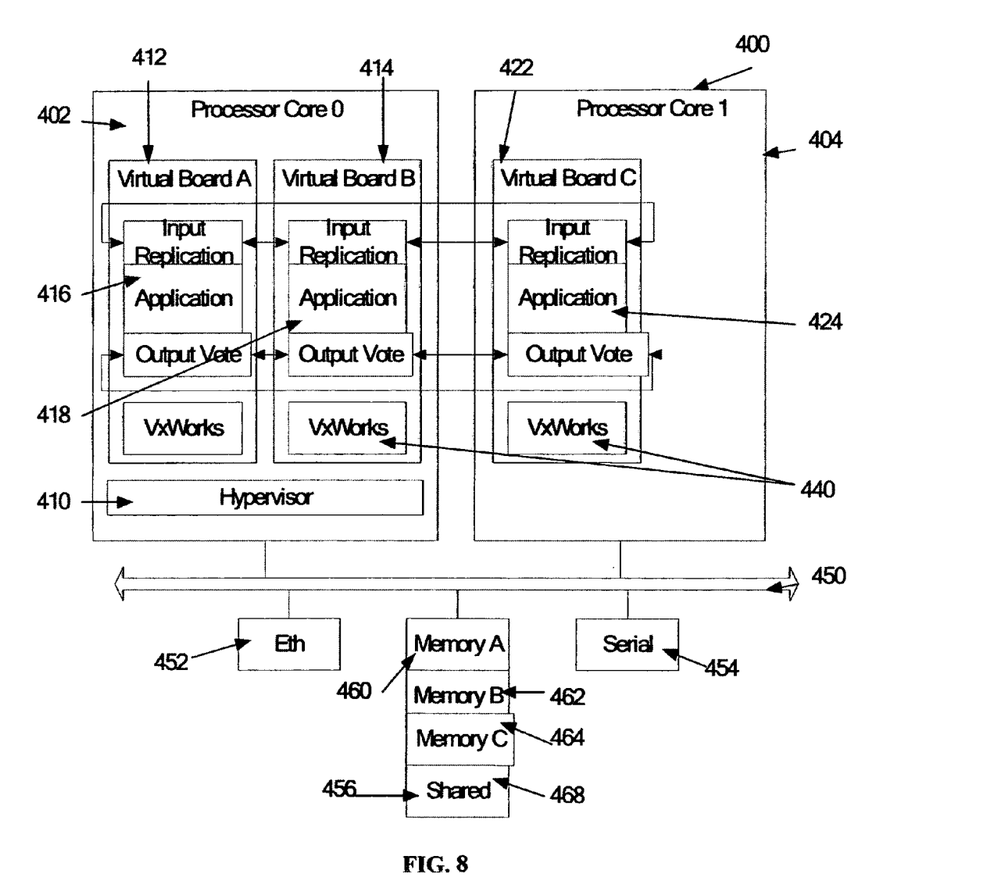
FIG. 8 is a diagram of a symmetric multiple core redundant virtual machine comprising a further embodiment of the present subject matter.

The embodiment of FIG. 8 provides even greater reliability. FIG. 8 is a diagram of a symmetric multiple core redundant virtual machine comprising a processor 400 having multiple cores. In the present illustration, first and second cores 402 and 404 are provided. This embodiment utilizes a symmetric multi-processing redundant virtual machine (SMP-RTM). A hypervisor 410 resolves the first core 402 into first and second virtual boards 412 and 414. The virtual boards 412 and 414 respectively include first and second application spaces 416 and 418. The second core 404 hosts another virtual board. In the present illustration, the second core 404 hosts a virtual board 422. The virtual board 422 comprises an application space 424. In the present illustration, a kernel/operating system 440 is provided. In the present illustration, Vx works is provided for each of the virtual boards for 412, 414 and 422. Other operating systems may be used.

The processor 400 communicates with the data bus 450 which may exchange information with an Ethernet I/O 452 and a serial I/O 454, as well as a memory 456. For convenience in processing, the memory 456 may include first, second, and third sections 460, 462 and 464. A shared memory section 468 may also be provided.

Figure 9:
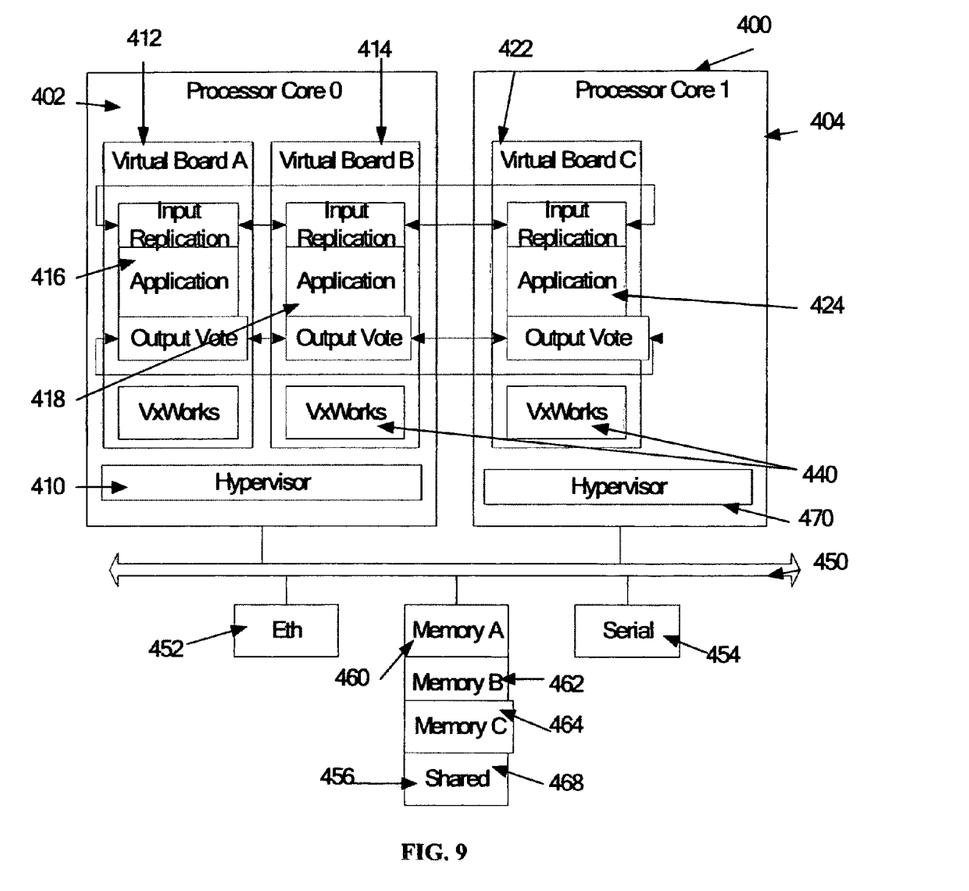
FIG. 9 is a block diagram of an asymmetric multicore redundant virtual machine comprising a further embodiment of the present subject matter.

FIG. 9 illustrates an asymmetric multi-processing redundant virtual machine (AMP-RTM). The structure is similar to that of the embodiment of FIG. 8. The same reference numerals are used to denote components corresponding to those in FIG. 8. However, the second core 404 includes a separate hypervisor 470. Reliability is increased, inter alia, by having a second hypervisor. Also, in operation, if one of the actual or virtual hoards 412, 414, or 422 hangs from an SEFI, the hardened core can detect and "notify" the operational core, 400 or 404, if the other core is hung. Consequently, software can provide for the option of continuing operations of the "good" core, while the other core is recovering. Consequently, when the hang occurs, downtime is minimized or eliminated. Additional virtual boards can be added to the system to implement an N-modular redundancy system, where N may be greater than three.

Operation to Detect SEUs and SEFIs

Figure 10:
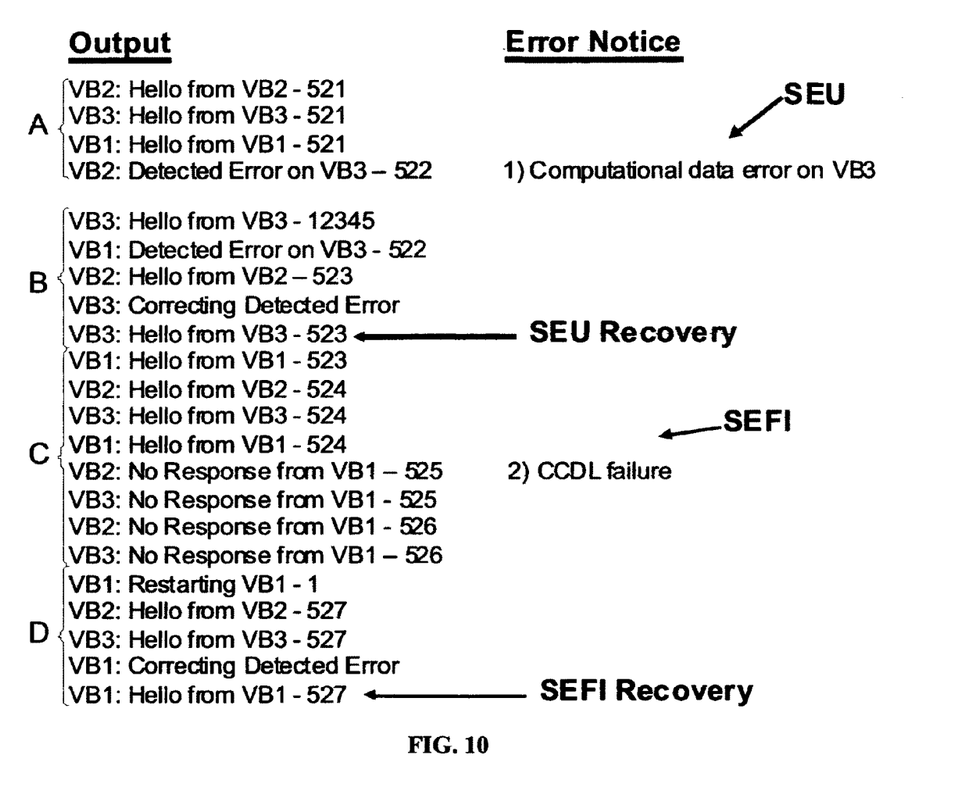
FIG. 10 is a listing of outputs from selected circuit boards illustrating operation of a preferred embodiment.
Figure 12:
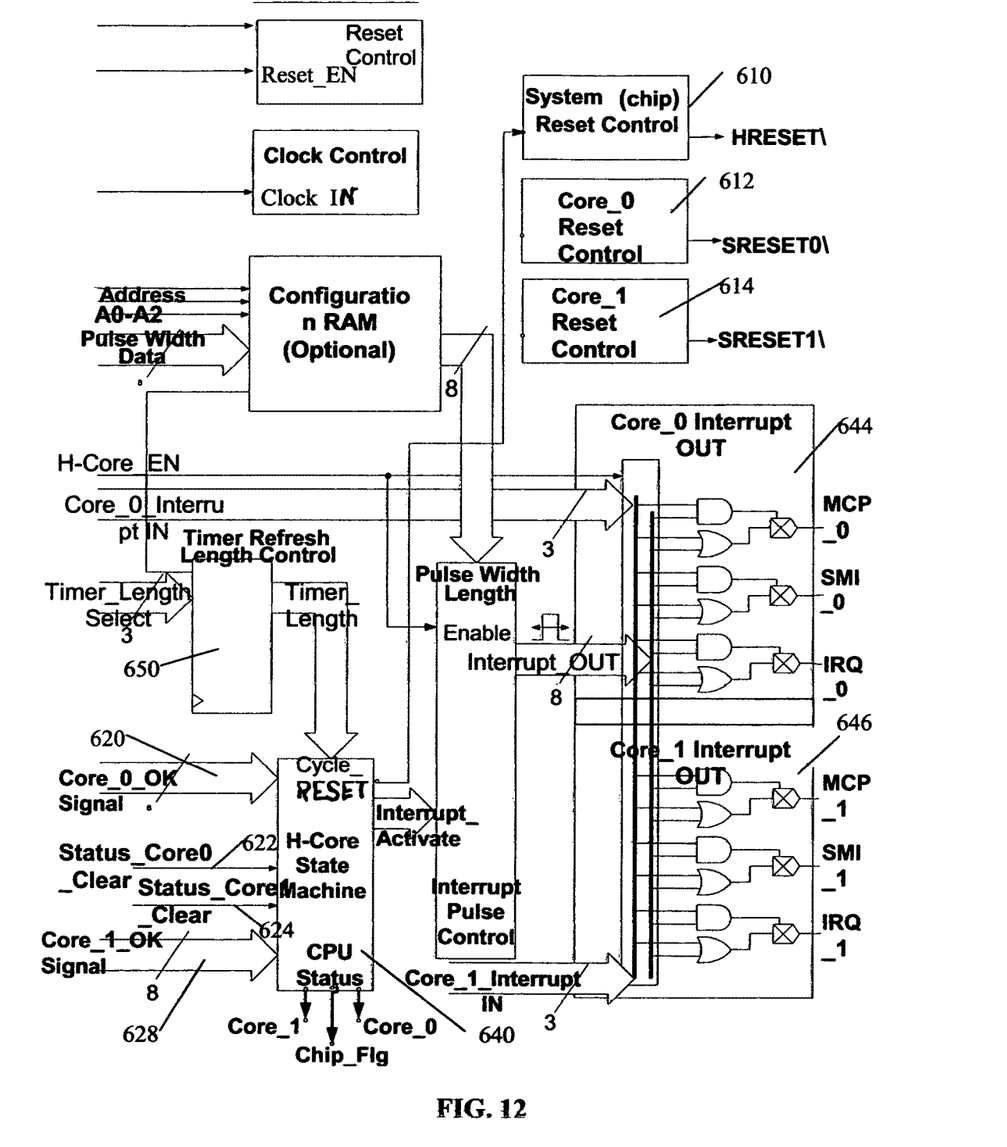
FIG. 12 is a chart illustrating operation of a hardened core to mitigate single event functional interrupts in one preferred embodiment.
Figure 13:
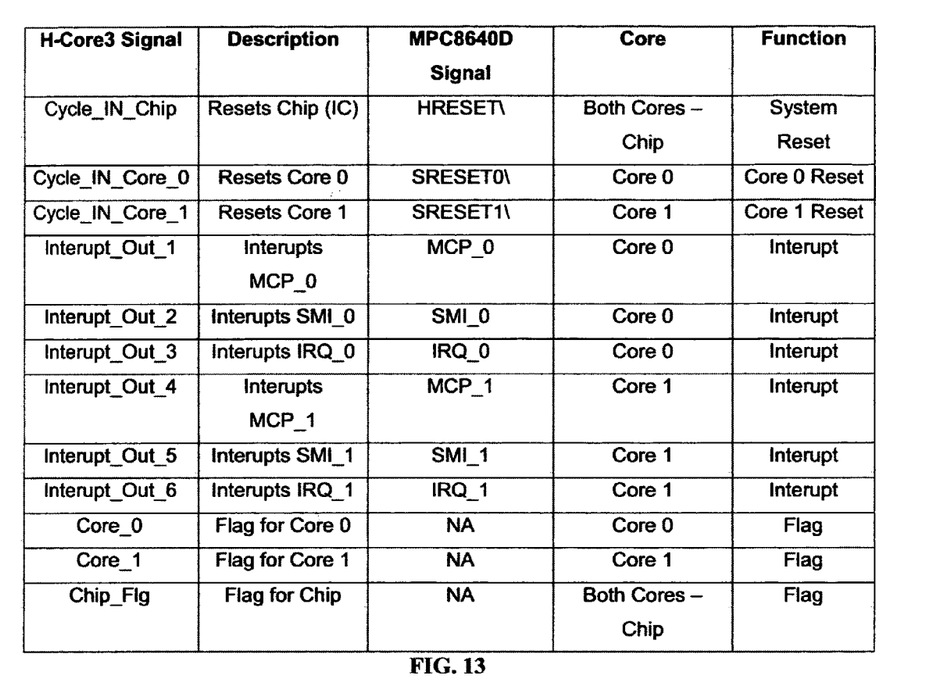
FIG. 13 is a chart which is a legend for signal abbreviations in FIG. 12.

FIG. 10 is a description of operation for SEU detection in the context of, for example, the processors of FIGS. 9 and 13, and for detection and clearing of SEFIs in the context of, for example, the processor of FIG. 12. FIG. 10 illustrates outputs from selected circuit boards illustrating operation of a preferred embodiment. In this illustration, VB1, VB2, and VB3 correspond to virtual boards 412, 414, and 420. Section A of FIG. 10 describes the comparison of instructions produced by each virtual board sensing of an SEU in response to a discrepancy. Section B illustrates recovery from an SEU.

Section C illustrates comparison of outputs from the virtual boards 412, 414 and 420. Where no response is received, a hang is detected, which indicates an SEFI. Section D indicates a reset and recovery from the SEFI.

Hardened Core for Correction of Hangs

Figure 11:
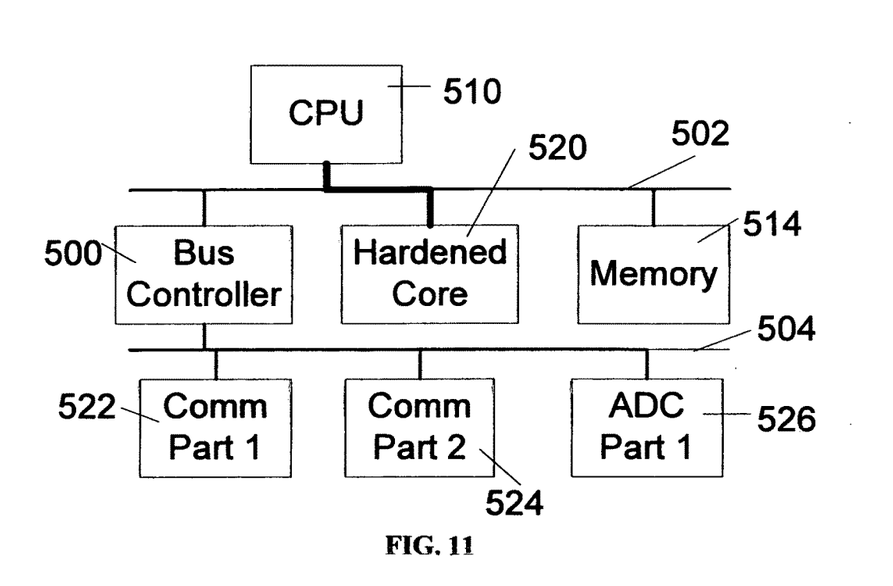
FIG. 11 is a block diagram of a computer utilizing a hardened core.

The time and space redundant techniques correct SEUs. Additionally, a technique is provided in order to correct SEFIs. FIG. 11 is a block diagram of a hardened core arrangement for SEFI mitigation. FIG. 11 could be viewed as illustrating prior arrangements. Further specific features in accordance with the present subject matter are discussed below. A bus controller 500 controls communications on a status signal bus 502 and a communications bus 504. A processor 510, which, for example, may correspond to the processor 400 of FIG. 8 and FIG. 9 will have SEUs corrected and will be reset in the event of an SEFI. The processor 510 receives signals from the status signal bus 502. Also connected to the status signal bus 502 are a memory 514 and hardened core 520. First and second communications ports 522 and 524 may be connected to the communications bus 504, as well as a memory 514.

The hardened core 520 is a radiation hard circuit that has an oversight monitor in order to determine and recover the processor 510 in the event of an SEFI. The hardened core 520 provides a low duty cycle, periodic signal to the processor 510. The processor 510 must provide a preselected response within a preselect period of time, plus interrupt and reset control of the processor 510. If the processor 510 is hung by an SEFI, it will not provide a response. As described below with respect to FIG. 12, the circuit will force a series of escalating corrections including the following actions: 1) toggle processor interrupt(s); 2) toggle the processor 510's non-maskable interrupts followed by a recovery software routine; and 3) hardware reset of the processor 510, followed by recovery software routine.

A hardware flag provides correction if the processor 510 returns from an SEFI, initiating special routines to "self-test" or "roll back" operation to return the hardware to a known state. Failure to recover will cause the hardened core 522 to go to the next level, as further described with respect to FIG. 12. The hardened core 520 as embodied in a microcircuit chip may be radiation hardened by triple modular redundant FPGAs or radiation hardened ASICs. The hardened core 520 may, for example, be embodied in a Peregrine SOI 0.5 µm radiation hardened ASIC, manufactured by Peregrine Semiconductor Corp. of San Diego, Calif. Another option comprises radiation hardened FPGAs made by Actel Corporation of Mountain View, Calif.

Hardened core techniques may also be applied to a dual-core processor. Each core has its own program counter. This enables each core to run its own independent software thread. Therefore, the program counter is an area where an SEU can propagate to become an SEFI. The mechanism for this propagation is the upsetting of the value of the program counter. This causes the processor to jump outside the code range to memory areas that are not code. Therefore, the processor hangs, and an SEFI event has occurred. Consequently, only one of the cores will hang. The other core should continue operating.

In order to implement the present technique on a dual core processor, signals that need to be toggled in the event of an SEFI hang must be identified. One dual core processor used in connection with this technique is the Freescale P2020 PowerPC. FIG. 12 is a block diagram of a section of the Freescale P2020 PowerPC configured to operate in accordance with the present subject matter. The circuit of FIG. 12 includes first and second program counters which respond, as further described below, to first and second program counts produced by the processor 100. The same reference numerals are used to denote elements corresponding to those in FIG. 8 and FIG. 9.

FIG. 13 is a chart which is a legend for signal abbreviations in FIG. 12. These signals are interrupt and reset signals that are available for use within the Freescale P2020 PowerPC. This processor 100 has multiple interrupts, MCP, SMI, and IRQ, provided for each of the cores 102 and 104, provided by interrupt circuits 644 and 646 respectively. These multiple interrupts represent the series of escalating corrections referred to in the description of FIG. 11. The processor 100 also has an overall system reset, (HRESET\) and individual resets for each core (SRESET_0\ and SRESET_1\). It is noted that the MPC8641D has the same interrupt and reset.

Reset control chips 610, 612, and 614 (FIG. 12) respectively provide the HRESET\, SRESET_0\, and SRESET_1\reset signals. Status signals 620 and 628 provide respective input signals from first and second program counters in the processor 100 to an H-core state machine 640. Status signals 622 and 624 periodically clear the program count signals during normal operation. A timer refresh link control circuit 650 provides input to the H-core state machine 640 so that a hang may be detected if the processor 510 (FIG. 10) does not issue a correct signal in time to indicate that a hang has not occurred.

Figure 14:
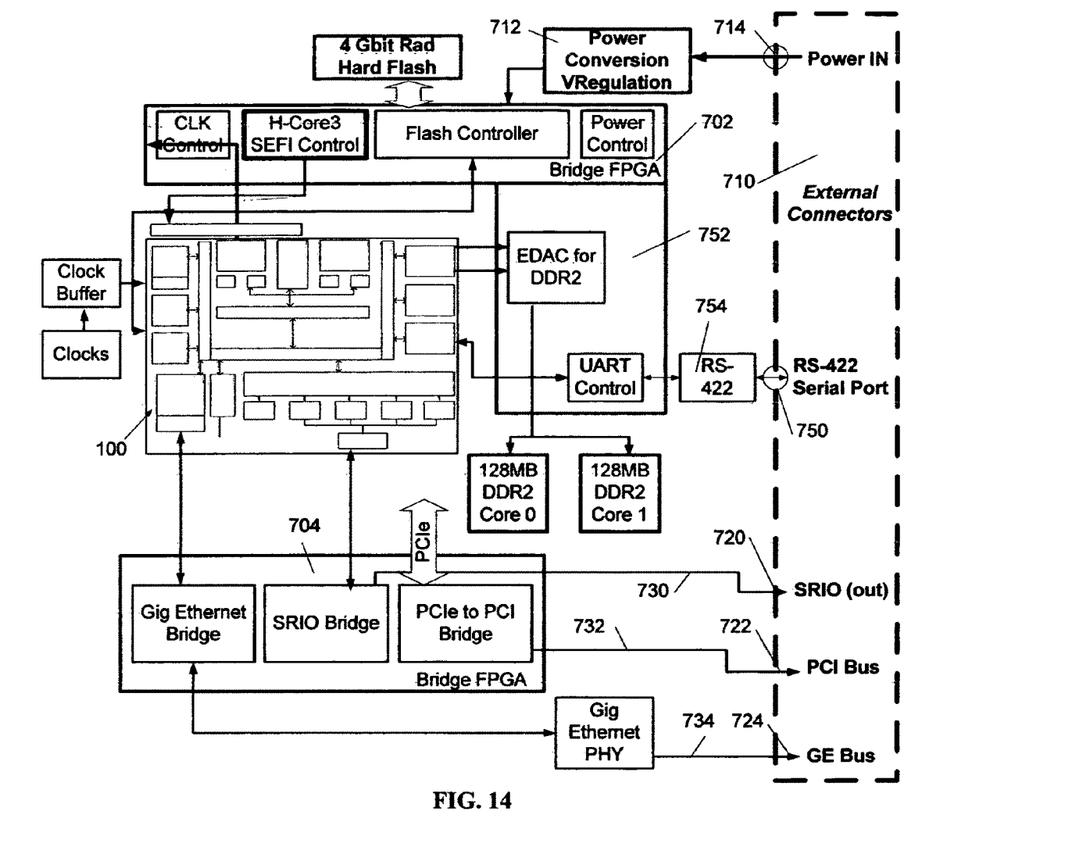
FIG. 14 is a block diagram illustrating a further embodiment utilizing another form of embedded processor.

FIG. 14 is a block diagram illustrating a single board computer 700 utilizing techniques according to the present subject matter. This present subject matter is embodied in, for example, the Proton400k computer made by Space Micro, Inc. of San Diego, Calif.

The processor 100 is connected to an input circuit 702 and to an output circuit 704. Each of input and output circuits 702 and 704 could comprise an RTAX2000SL Bridge FPGA, made by Micro semi SoC Products Group (formerly Actel) of Mountain View, Calif. A connector 710 connects the computer 700 to systems which use the computer 700. A power converter 712, powering the computer 700, receives power from connector power terminal 714. The output circuit 704 exchanges data with the connector 710 at terminals 720, 722, and 724 respectively connected to buses 730, 732, and 734. The buses 730, 732, and 734 are respectively a serial rapid I/O bus (SRIO), a PCI bus, and a Gigabit Ethernet Bus. Terminal 750 connects via an RS-422 bus to a universal asynchronous receiver/transmitter (UART) control circuit 754.

What is claimed is:

1. A redundancy system in a fault tolerant computer comprising: a processor having at least two cores to execute instructions, at least two operating systems each running on one of said at least two cores and each providing a separate software thread, said processor including instructions to execute first and second identical instructions to the processor to produce first and second respective results to be compared in a redundancy routine, said compared results being produced during separate time periods, a comparison command executed in one of said cores, said comparison providing an output indicative of equality or inequality of said first and second results, an indication of inequality comprising an SEU error signal, and producing a third instruction signal coupled for voting in one of said cores in response to an SEU error signal, said processor having a real time operating system and a processing rate of at least one gigahertz.

2. The redundancy system according to claim 1 wherein said processor comprises a multicore virtual machine.

3. A redundancy system in a fault tolerant computer comprising: a processor having at least two cores to execute instructions, at least two operating systems each running on one of said at least two cores and each providing a separate software thread, said processor including instructions to execute first and second identical instructions to the processor to produce first and second respective results to be compared in a redundancy routine, said compared results being produced during separate time periods, a comparison circuit coupled to compare said first and second results, said comparison circuit providing an output indicative of equality or inequality of said first and second results, an indication of inequality comprising an SEU error signal, and producing a third instruction signal coupled for voting in response to an SEU error signal, said processor having a real time operating system and a processing rate of at least one gigahertz, wherein said processor comprises a multicore virtual machine, and wherein said multicore virtual machine comprises a single core and a virtualizing circuit resolving said core into first and second virtual circuit boards, and a timing circuit for processing the first instruction on the first virtual circuit board, processing the second instruction on the second virtual circuit board, and for processing the third instruction on the first virtual circuit board at a later time.

4. The redundancy system according to claim 3 wherein said multicore virtual machine comprises a first core and a second core and a virtualizing circuit resolving said first core into first and second virtual circuit boards.

5. The redundancy system according to claim 4 further comprising a second virtualizing circuit connected for providing at least one virtual circuit board on the second core.

6. The redundancy system according to claim 5 wherein each said core runs separate copies of the same operating system.

7. The redundancy system according to claim 5 wherein at least two cores each run a different operating system.

8. A redundancy system in a fault tolerant computer also including an SEFI detection and recovery circuit comprising: a multiple core processor having a first and a second real time operating system, each operating system running on a separate core, a redundancy circuit to detect and recover from a single event upset, the redundancy circuit being coupled to compare first and second results each produced in a separate time period, the comparison being executed in one of said cores, and further comprising a hang detecting circuit responsive to failure to receive a signal indicative of operation of one operating system of said processor, said hang detector circuit responding to absence of a processor output at a predetermined count of a first program counter, said hang detector being further coupled to respond to a second program counter providing a program count for detecting hang of said second operating system, and means responsive to said hang detector to switch operation to said first or second operating system which is not hung.

9. An SEFI detection and recovery circuit comprising: a multiple core processor having a first and a second real time operating system, each operating system running on a separate core, a redundancy circuit being coupled to compare first and second results each produced in a separate time period, the comparison being executed in one of said cores, a hang detecting circuit responsive to failure to receive a signal indicative of operation of one operating system of said processor, said hang detector circuit responding to absence of a processor output at a predetermined count of a first program counter, said hang detector being further coupled to respond to a second program counter providing a program count for detecting hang of said second operating system, and means responsive to said hang detector to switch operation to said first or second operating system which is not hung.

10. The SEFI detection and recovery circuit according to claim 9 wherein said first and second operating systems comprise copies of the same operating system program.

11. A redundancy system in a fault tolerant computer comprising: a processor having at least two cores to execute instructions, at least a first operating system and a second operating system each running on a separate one of said at least two cores and providing a software thread, said processor including instructions to execute first and second identical instructions to the processor to produce first and second respective results to be compared in a redundancy routine, said compared results being produced during separate time periods, said comparison being performed in one of said cores, a comparison command executed in one of said cores, said comparison providing an output indicative of equality or inequality of said first and second results, an indication of inequality comprising an SEU error signal, and producing a third instruction signal coupled for voting in one of said cores in response to an SEU error signal, said processor having a real time operating system and a processing rate of at least one gigahertz.

12. The redundancy system according to claim 11 wherein said processor comprises a multicore virtual machine.

13. The redundancy system according to claim 12 wherein said multicore virtual machine comprises a single core and a virtualizing circuit resolving said core into first and second virtual circuit boards, and a timing circuit for processing the first instruction on the first virtual circuit board, processing the second instruction on the second virtual circuit board, and for processing the third instruction on the first virtual circuit board at a later time.

14. A redundancy system in a fault tolerant computer comprising: a processor having at least two cores to execute instructions and a first operating system and a second operating system running on a first core and a second core of said at least two cores respectively, said processor including instructions to execute first and second identical instructions to the processor to produce first and second respective results to be compared in a redundancy routine, said compared results being produced during separate time periods, a comparison command executed in one of said cores, said comparison providing an output indicative of equality or inequality of said first and second results, an indication of inequality comprising an SEU error signal, and producing a third instruction signal coupled for voting in one of said cores in response to an SEU error signal, said processor having a real time operating system and a processing rate of at least one gigahertz.

15. The redundancy system according to claim 14 wherein said processor comprises a multicore virtual machine.

16. The redundancy system according to claim 15 wherein said multicore virtual machine comprises a single core and a virtualizing circuit resolving said core into first and second virtual circuit boards, and a timing circuit for processing the first instruction on the first virtual circuit board, processing the second instruction on the second virtual circuit board, and for processing the third instruction on the first virtual circuit board at a later time.

* * * * *